(12) United States Patent
Jacenków et al.

(10) Patent No.: US 11,610,303 B2
(45) Date of Patent: Mar. 21, 2023

(54) DATA PROCESSING APPARATUS AND METHOD

(71) Applicants: The University Court of the University of Edinburgh, Edinburgh (GB); CANON MEDICAL SYSTEMS CORPORATION, Otawara (JP)

(72) Inventors: Grzegorz Jacenków, Edinburgh (GB); Sotirios Tsaftaris, Edinburgh (GB); Brian Mohr, Edinburgh (GB); Alison O'Neil, Edinburgh (GB); Aneta Lisowska, Edinburgh (GB)

(73) Assignees: The University Court of the University of Edinburgh, Edinburgh (GB); CANON MEDICAL SYSTEMS CORPORATION, Otawara (JP)

( * ) Notice: Subject to any disclaimer, the term of this patent is extended or adjusted under 35 U.S.C. 154(b) by 169 days.

(21) Appl. No.: 16/992,466

(22) Filed: Aug. 13, 2020

(65) Prior Publication Data
US 2021/0279863 A1 Sep. 9, 2021

Related U.S. Application Data

(60) Provisional application No. 62/984,471, filed on Mar. 3, 2020.

(51) Int. Cl.
*G06T 7/00* (2017.01)
(52) U.S. Cl.
CPC .. *G06T 7/0012* (2013.01); *G06T 2207/20024* (2013.01); *G06T 2207/20081* (2013.01); *G06T 2207/20084* (2013.01); *G06T 2207/20132* (2013.01); *G06T 2207/30004* (2013.01)

(58) Field of Classification Search
CPC ........ G06T 7/0012; G06T 2207/20081; G06T 2207/10072; G06T 2207/10116; G06T 2207/20084; G06T 2207/30004; G06T 5/20; G06T 5/00; G06T 2207/20024; G06T 2207/20132
See application file for complete search history.

(56) References Cited

U.S. PATENT DOCUMENTS

2007/0286525 A1 12/2007 Mahesh et al.
2012/0008846 A1 1/2012 Meetz et al.
(Continued)

FOREIGN PATENT DOCUMENTS

WO WO-9616534 A2 * 6/1996 ............. G06T 5/009

OTHER PUBLICATIONS

Ip et al. "An Efficient CNN Implementation of a 2D Orientation and Scale Tunable Low-pass Filter Based on the Approximation of an Oriented 2D Gaussian Filter." 48th Midwest Symposium on Circuits and Systems, Aug. 7, 2005, pp. 895-898 (Year: 2005).*
(Continued)

*Primary Examiner* — Jon Chang
(74) *Attorney, Agent, or Firm* — Oblon, McClelland, Maier & Neustadt, L.L.P.

(57) ABSTRACT

A medical image data processing apparatus is provided and includes processing circuitry to receive medical image data in respect of at least one subject; receive non-image data; generate a filter based on the non-image data; and apply the filter to the medical image data, wherein the filter limits a region of the medical image data.

18 Claims, 6 Drawing Sheets

(56) References Cited

U.S. PATENT DOCUMENTS

| | | |
|---|---|---|
| 2015/0087957 A1* | 3/2015 | Liu .................. G06K 9/6256 600/408 |
| 2016/0063726 A1 | 3/2016 | Wenzel et al. |
| 2016/0217368 A1 | 7/2016 | Ioffe et al. |
| 2019/0005684 A1 | 1/2019 | Defauw et al. |
| 2019/0180860 A1 | 6/2019 | Bronkalla et al. |
| 2019/0350564 A1 | 11/2019 | Gajdos et al. |

OTHER PUBLICATIONS

Grzegorz Jacenków, Alison O'Neil, and Sotirios Tsaftaris, Instance Normalisation with Spatial Dependency (INSIDE). The University of Edinburg, United Kingdom; Canon Medical Research Europe, United Kingdom; The Alan Turing Institute, United Kingdom.

Huang, X., et al., "Arbitrary Style Transfer in Real-Time with Adaptive Instance Normalization", Retrieved from the internet: https://arxiv.org/abs/1703.06868, 2017, pp. 1-11.

Perez, E., et al., FILM: Visual Reasoning with a General Conditioning Layer, Retrieved from the Internet: https://arxiv.org/abs/1709.07871, 2018, pp. 1-13.

Ruppercht, C., et al., "Guide Me: Interacting with Deep Networks", Retrieved of the internet: https://arxiv.org/abs/1803.11544, 2018, pp. 1-11.

Kosiorek, A.R., et al., "Hierarchical Attentive Recurrent Tracking", 31$^{st}$ Conference on Neural Information Processing Systems (NIPS2017), Retrieved from the Internet: https://papers.nips.cc/paper/6898-hierarchical-attentiverecurrent-tracking.pdf, 2017, pp. 1-9.

Park, T., et al., "Semantic Image Synthesis with Spatially-Adaptive Normalization", Retrieved from the internet: https://arxiv.org/abs/1903.07291, 2019, pp. 1-19.

\* cited by examiner

DATA PROCESSING APPARATUS AND METHOD

CROSS-REFERENCE TO RELATED APPLICATIONS

The present application is a non-provisional of and claims the benefit of U.S. Provisional Application Ser. No. 62/984,471, filed on Mar. 3, 2020; the entire contents of which are incorporated herein by reference.

FIELD

Embodiments described herein relate generally to a method and apparatus for processing data, for example for training a machine learning model and/or labelling data sets.

BACKGROUND

It is known to train machine learning algorithms to process data, for example medical data.

Training of machine learning models can be performed using either supervised or unsupervised techniques, or a mixture of supervised and unsupervised techniques.

Supervised machine learning techniques require large amounts of annotated training data to attain good performance. However, annotated data can be difficult and expensive to obtain, especially in the medical domain where often only domain experts, whose time is scarce, can provide reliable labels. It may be desirable to improve the quality of outputs of trained machine learning models and/or to reduce the amount of annotated training data needed to train the models and/or to reduce the burden of annotation by an expert.

BRIEF DESCRIPTION OF THE DRAWINGS

Embodiments are now described, by way of non-limiting example, and are illustrated in the following figures, in which.

DETAILED DESCRIPTION

Certain embodiments provide a medical image data processing apparatus comprising processing circuitry configured to:
receive medical image data in respect of at least one subject;
receive non-image data;
generate a filter based on the non-image data; and
apply the filter to the medical image data, wherein the filter is configured to limit a region of the medical image data.

Certain embodiments provide a method of processing medical image data comprising:
receiving medical image data in respect of at least one subject;
receiving non-image data;
generating a filter based on the non-image data; and
applying the filter to the medical image data, wherein the filter is configured to limit a region of the medical image data.

Figure 1:
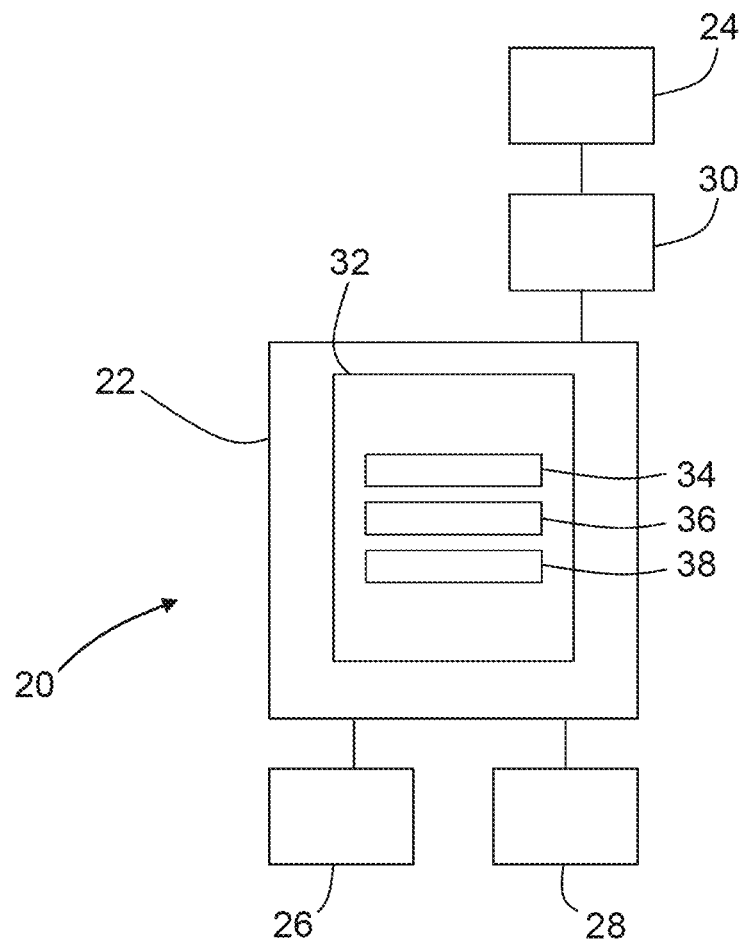
FIG. 1 is a schematic illustration of an apparatus in accordance with an embodiment.

A data processing apparatus 20 according to an embodiment is illustrated schematically in FIG. 1. In the present embodiment, the data processing apparatus 20 is configured to process medical imaging data. In other embodiments, the data processing apparatus 20 may be configured to process any appropriate data, for example imaging data, text data, structured data or a combination of heterogeneous data.

The data processing apparatus 20 comprises a computing apparatus 22, which in this case is a personal computer (PC) or workstation. The computing apparatus 22 is connected to a display screen 26 or other display device, and an input device or devices 28, such as a computer keyboard and mouse.

The computing apparatus 22 is configured to obtain image data sets from a data store 30. The image data sets have been generated by processing data acquired by a scanner 24 and stored in the data store 30.

The scanner 24 is configured to generate medical imaging data, which may comprise two-, three- or four-dimensional data in any imaging modality. For example, the scanner 24 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner. The medical imaging data may comprise or be associated with additional conditioning data, which may for example comprise non-imaging data.

The computing apparatus 22 may receive medical image data and/or the further conditioning data from one or more further data stores (not shown) instead of or in addition to data store 30. For example, the computing apparatus 22 may receive medical image data from one or more remote data stores (not shown) which may form part of a Picture Archiving and Communication System (PACS) or other information system.

Computing apparatus 22 provides a processing resource for automatically or semi-automatically processing medical image data. Computing apparatus 22 comprises a processing apparatus 32. The processing apparatus 32 comprises model training circuitry 34 configured to train one or more models; data processing/labelling circuitry 36 configured to apply trained model(s) to obtain outputs and/or to obtain labels, for example to obtain labels, segmentations or other processing outcomes, for example for output to a user or for providing to the model training circuitry 34 for further model training processes; and interface circuitry 38 configured to obtain user or other inputs and/or to output results of the data processing.

In the present embodiment, the circuitries 34, 36, 38 are each implemented in computing apparatus 22 by means of a computer program having computer-readable instructions that are executable to perform the method of the embodiment. However, in other embodiments, the various circuitries may be implemented as one or more ASICs (application specific integrated circuits) or FPGAs (field programmable gate arrays). The computing apparatus 22 also includes a hard drive and other components of a PC including RAM, ROM, a data bus, an operating system including various device drivers, and hardware devices including a graphics card. Such components are not shown in FIG. 1 for clarity.

The data processing apparatus 20 of FIG. 1 is configured to perform methods as illustrated and/or described in the following.

It is a feature of certain embodiments that conditioning data in the form of non-image data can be used to generate a spatially varying function, also referred to as a filter, that can provide an attention mechanism that enables integration of non-imaging information for spatial localisation in imaging pipelines. The information can, for example, be transformed into a region of interest (ROI) which can be applied during training of a neural network or other model to focus attention on particular regions of the image data based on the non-image information.

The use of an attention mechanism based on the generated spatial-dependent filter in training models can be useful for example, but not limited to, models used for annotation of medical images and can for example improve quality of predictions without requiring annotation of additional training data sets, for example by an expert. In such applications, most images come with some non-imaging information, for example electronic health records (EHRs) and (DICOM) meta-data, and it is such non-image data that in some embodiments is used to generate the spatially varying function, e.g. the filter, used as the spatially-dependent attention mechanism in the training process A process of applying non-image information in providing a spatially-dependent attention mechanism in the training of a neural network or other model, performed by the embodiment of FIG. 1 is now described in more detail with reference to FIG. 2.

At a first stage 40 of the process, the interface circuitry 38 receives annotated training sets of medical image data for a plurality of subjects representing an anatomical region that is under consideration. A single image is shown at stage 40 for the purposes of illustration only but it will be understood that a plurality of annotated training sets of medical image data are used in the training of the model.

Each of the annotated training sets of medical image data comprises medical image data representing the anatomical region that is under consideration, and for each data set the annotations provide an identification of a particular anatomical feature or pathology of interest that is the subject of the model training process. The model training process is intended to train the model so that the trained model can be applied subsequently to new data sets, for example by the data processing/labelling circuitry 36, to obtain annotation of the anatomical feature or pathology of interest in each of the new data sets. Such new data sets may for example be data sets obtained by the scanner 24.

The annotations included in the annotated training set may, for example comprise labels used to represent segmentations of the image data (for example, which pixels or voxels, or regions of pixels or voxels, correspond to the anatomical feature or pathology of interest).

Figure 2:
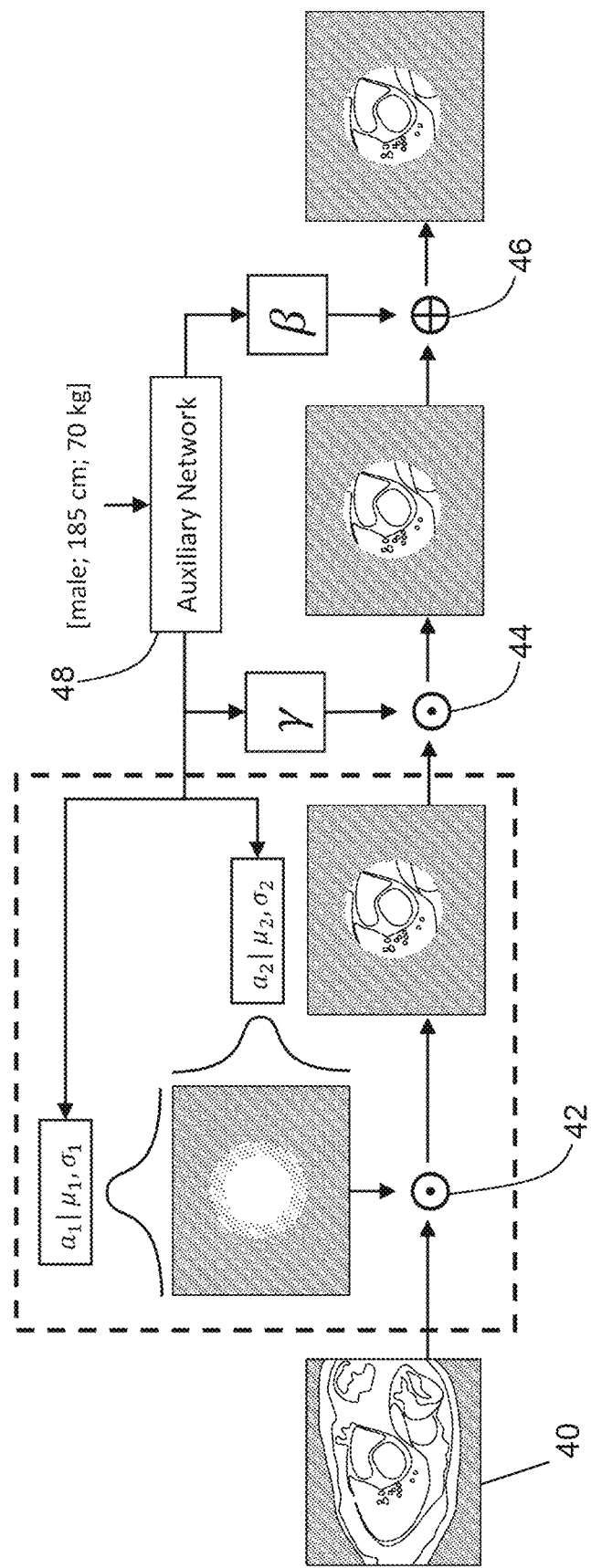
FIG. 2 is a schematic illustration of a process performed by the embodiment of FIG. 1.

After receipt of the annotated training sets of medical image data they are passed by the interface circuitry 38 to the model training circuitry 34. In the embodiment of FIG. 2, the model training circuitry 34 provides a convolutional neural network (CNN) and trains the CNN on the annotated training sets of medical images.

The CNN of the embodiments of FIG. 2 has a structure or architecture based generally on that of any suitable known CNN and includes a plurality of layers including convolutional layers, fully connected layers and pooling layers together with input and output layers. Any other suitable layers may also be included in accordance with known CNN methods.

In accordance with known techniques, for a particular layer, feature maps are generated as an output from the processes performed by the preceding layer, and the feature map is provided as an input to said layer. The output of that layer, e.g. in the form of a feature map, is then provided as an input to the next layer of the CNN. Each layer can have any suitable number of input channels and output channels. At each layer, any suitable desired processes may be performed, for example filters/convolutions, pooling, ReLU processes or any other desired processes. In embodiments, any suitable number of layers can be provided, and any suitable number and arrangement of layers of each type, constrained only, for example, by the requirements of the particular CNN techniques and architectures being used.

For clarity, FIG. 2 does not show each layer of the CNN of the embodiment or the ordering and connections between layers. Instead, FIG. 2 illustrates schematically certain conditioning processes 42, 44, 46 performed at layers of the CNN in the embodiment of FIG. 2.

Although the processes 42, 44, 46 are shown adjacent to each other in FIG. 2, this is not intended to indicate that the processes are necessarily performed at consecutive layers of the CNN, although they may be in some embodiments if desired. In embodiments according to FIG. 2, the processes 42, 44, 46 may be performed at any desired layers of the CNN, which may be separated by any desired number of other layers of the CNN.

It is a feature of the embodiment of FIG. 2 that it includes an auxiliary network 48 or other model or algorithm in addition to the main CNN. The auxiliary network 48 may be another CNN or any other suitable type of neural network, deep learning algorithm or alternative trainable or other model.

As indicated in FIG. 2, in the illustrated embodiment the auxiliary network receives non-image data that can be used to restrict or influence the space of plausible outputs of the main CNN (for example, the plausible outputs for a task of identifying a particular anatomical feature of interest in each set of image data).

In the particular implementation example shown in FIG. 2, the non-image data that is input to the auxiliary network is shown as being biological sex (for example, male or female) of the subject, height of the subject, and weight of the subject.

It can be understood that such non-image data can be relevant to size, location or other characteristics of an anatomical feature of interest. For example, properties of, say, the heart or blood vessels of a young fit subject may be expected to be different to those of an older, overweight and unfit subject, and the size, shape, position or relative position amongst other properties may vary in dependence on such non-image data or other conditioning data.

As illustrated schematically in FIG. 2, the output of the auxiliary network 48 can provide scale (γ) and shift (β) parameters as outputs that are provides at inputs to processes 44, 46 at layers of the model. The scale and shift parameters are used to transform an image, Fc, (e.g. training image data set(s) or a feature map derived from preceding layers of the CNN) in accordance with a batch normalisation process, for example as represented by $\gamma F_c - \mu/\sigma + \beta$. Any suitable batch normalisation process may be applied in the CNN, for example a batch normalisation process as described in Batch Normalization: Accelerating Deep Network Training by Reducing Internal Covariate Shift, Ioffe et al, 2015, arXiv.1502.03167 or US2016217368.

As part of the processes 44, 46 a separate scale (γ) and shift (β) factor is applied to each channel at the relevant layer(s) of the CNN allowing resulting individual feature maps to be amplified or suppressed, and thus affecting the final prediction of the CNN. However, in general such batch normalisation processes, for example as applied at 44, 46, do not provide the flexibility to adjust channels in dependence on spatial position, instead the scale and shift factors modify the whole feature map.

It is a significant feature of embodiments according to FIG. 2 that spatially dependent conditioning in dependence on non-image data is also provided at a layer or layers of the CNN. In particular, in embodiments according to FIG. 2, a spatially dependent filter is generated that provides an attention mechanism based on a differentiable function (for example, a Gaussian) that may, for example, be provided prior to applying feature-wise transformation.

The filter has the effect of limiting a region of the medical image data such that more attention (for example, more weight or importance) is given to that spatial region of the image data in training the model. For example, if for a subject having particular values of non-image parameters the anatomical feature of interest may be more likely to be found in a particular spatial region of an image (for example, an aligned and/or normalized image) then the filter, acting as an attention function, may ensure that more attention is given to that region of the image when training the CNN or other model to label (for example, segment) the anatomical feature of interest in sets of image data.

In embodiments according to FIG. 2, the filter is generated as a product ($\alpha = \alpha_1 \alpha_2^T$) of two Gaussian vectors and is then integrated into a conditional instance normalisation layer 44. The mechanism is computationally efficient, adding only 4 parameters ($\mu_1, \sigma_1, \mu_2, \sigma_2$) to existing layers of the CNN. Any suitable spatially varying function can be used in other embodiments and embodiments are not limited to functions comprising a Gaussian or combination of Gaussians.

The parameter values that determine the shape and position of the Gaussians, for example values for the peak position and variance of each Gaussian, are determined in the embodiment of FIG. 2 as an output of the auxiliary network 48 based on the non-image data (e.g. subject's sex, height and weight in the case of the example data shown in FIG. 2) or other conditioning data that is provided, together with associated training sets of image data, as an input to the auxiliary network 48.

The filter, acting as an attention function, generated by the auxiliary network 48 can be shared across feature maps or applied one per channel when training the CNN. For example, Gaussians or other filters with different parameter values (e.g. peak position, variance) may be used for different feature maps and/or channels at one or more layers when training the CNN. The values of the parameters of the filters to be applied as attention functions for the different feature maps and/or channels in question can be learned separately by the auxiliary neural network 48. Alternatively, in some embodiments the same filter with the same parameter values can be used as an attention function for all relevant channels and/or more than feature map.

Although the Gaussian filter, acting as an attention function, is illustrated schematically in FIG. 2 as being applied at a single layer of the CNN, in other embodiments the filter, acting as an attention function, can be applied at more than one different layer of the CNN, or different filters obtained using non-image data, each acting as an attention function, can be applied at different layers of the CNN.

Although, height, weight and sex of a subject have been mentioned above in relation to a specific implementation of embodiments of FIG. 2, any suitable data can be used as conditioning data to provide spatially dependent attention. The conditioning data can be of any modality, e.g. image, one-hot encoded vector, structured text. The conditioning data can, for example, comprise or represent any one or more of age, weight, sex, presence or absence of a particular medical condition, at least one property of an imaging procedure or imaging apparatus, output(s) of another method, electronic health record(s) (HER), metadata, DICOM data, or metadata, audio data or structured data.

It is a feature of certain embodiments that if the conditioning data, for example, the non-image data does not include spatial information or does not have any relevance to spatial distribution of the image or relevant anatomical features or pathologies in the image, the method will generalise to a conditional instance normalisation layer, i.e. the attention will not affect the feature map (in practice, this means that for example a large diffuse Gaussian is created, for example by the auxiliary network 48, as a filter that applies equal weighting to the whole feature map).

In cases where the conditioning data does have relevance to the spatial distribution of the image or relevant anatomical features or pathologies in the image, in some embodiments the generating of the filter (e.g. the Gaussian or Gaussians) comprises applying a process that encourages the filter to be non-spatially uniform.

For example, to avoid the network defaulting to a general solution with a uniform attention map when not desired, a regularisation penalty can be included in a cost function using in process of generating then filter, to encourage learning of localisation. For instance, in the case of a Gaussian function, large diffuse Gaussians (e.g. having large standard deviations/variances) can be penalized in some embodiments with a training loss function such as:

$$\mathcal{L}(y, \hat{y}) + \eta \frac{1}{N} \sum_i^N \sigma_i$$

In the above expression, the first term, $L(y, \hat{y})$, is the main optimisation objective, for example Dice loss. The second term, $\eta 1/N \sum 1^N \sigma\_i$, is the penalty applied, for example standard deviation parameters of the attention Gaussian filters (e.g. large standard deviation values are penalized). A hyperparameter $\eta$ is used to control the trade-off between the main objective and the regularisation penalty. The above approach to encouraging non-spatial uniformity of the spatially dependent filter can be implemented by the auxiliary network 48 in the embodiment of FIG. 2. A loss function can be implemented in some embodiments in accordance with techniques described in, for example, Numerical Co-ordinate Regression with Convolutional Neural Networks, Nibali et al, 2018, arXiv:1801.07372.

Figure 3:
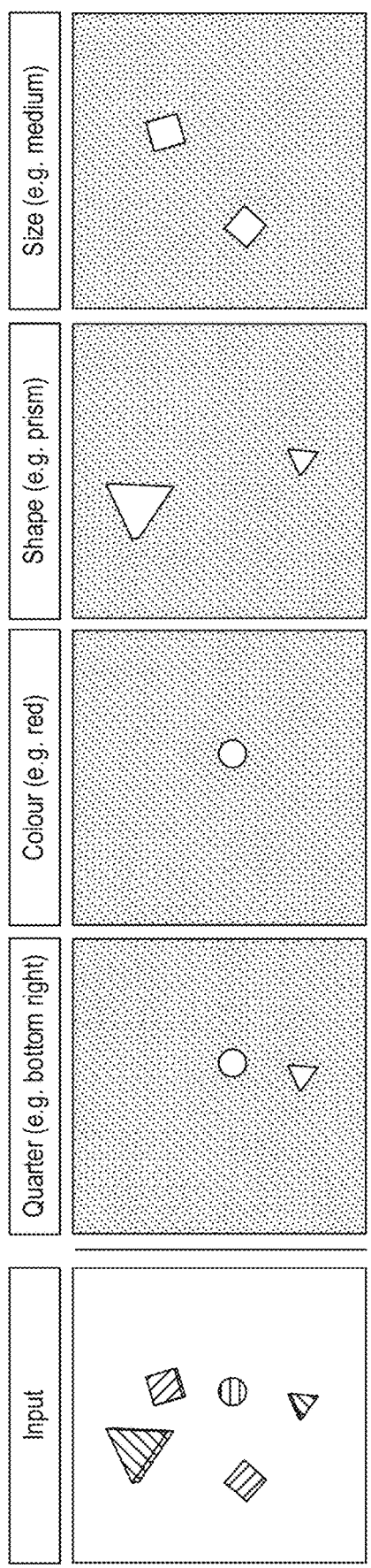
FIG. 3 shows images used in performing test processes using a process in accordance with FIG. 2.

The embodiment of FIG. 2 was applied to an extension of the CLEVR dataset (CLEVR: A Diagnostic Dataset for Compositional Language and Elementary Visual Reasoning Johnson et al, arXiv:1612.06890, 2016) that was modified to include segmentation masks and several conditioning scenarios. FIG. 3 shows in the bottom image a representation of the dataset to which the methods were applied including various features to be labelled (square, round and prism-shaped objects of different colours and locations).

In the application illustrated in FIG. 3, various tests were performed with the output of the CNN being conditioned on i) location (e.g. select only objects in the bottom-right corner), ii) colour (e.g. select only red objects), iii) shape (e.g. select only prisms), and iv) size (e.g. select only medium-size objects). In scenario i) the conditional factor includes spatial information, in scenarios ii) to iv) the conditional factor does not include spatial information.

The other images in FIG. 3, above the bottom image, show segmentation masks corresponding to the conditions i) to iv).

The task outlined in relation to FIG. 3 was performed using two variants of the embodiment of FIG. 2, one that used a filter (for example, an attention map in the form of a Gaussian) for each channel, referred to as the Exclusive Attention variant, and one for which a filter (for example, an attention map in the form of a Gaussian) was shared across attention maps, referred to as the Shared Attention variant.

The task was also performed based upon known techniques, referred to as Baseline (a known CNN without additional conditioning), FiLM (using techniques derived from FILM: Visual Reasoning with a General Conditioning Layer, Perez et al, arXiv:1709.07871, 2017), and Guide Me (using techniques derived from Guide Me: Interacting with Deep Networks, Rupprecht et al, arXiv:1803.11544, 2018).

The results of the tasks performed using the two variants of the embodiments of FIG. 2 and using the various known techniques, for the different conditioning scenarios i) to iv) are provided in the table below, in the form of the achieved Dice value. In each case the best performance was achieved by one of the embodiments of FIG. 2 (labelled as Proposed method in the table). The same basic segmentation network, e.g. CNN, was used for all of the techniques.

| Method | Notes | Quarter (i) Dice | Colour (ii) Dice | Shape (iii) Dice | Size (iv) Dice |
| --- | --- | --- | --- | --- | --- |
| Baseline | No conditioning | .293 (±.007) | .285 (±.002) | .276 (±.002) | .273 (±.012) |
| FiLM | — | .487 (±.020) | .898 (±.020) | .877 (±.012) | .842 (±.020) |
| Guide Me | — | .819 (±.033) | .893 (±.050) | .899 (±.020) | .843 (±.030) |
| Proposed | Shared Attention | .799 (±.025) | .878 (±.006) | .898 (±.007) | .854 (±.008) |
| Proposed | Exclusive Attention | .857** (±.025) | .907** (±.019) | .907** (±.019) | .854** (±.012) |

If a conditioning factor that is used does not include spatial information, e.g. does not relate to the absolute position within the image space, methods according to some embodiments generalise to a conditional instance normalisation layer.

The task was also performed on the ACDC dataset (Bernard, O., Lalande, A., Zotti, C., Cervenansky, F., Yang, X., Heng, P. A., Cetin, I., Lekadir, K., Camara, O., Ballester, M. A. G. and Sanroma, G., 2018. Deep Learning Techniques for Automatic MRI Cardiac Multi-structures Segmentation and Diagnosis: Is the Problem Solved?. IEEE Transactions on Medical Imaging, 37(11), pp. 2514-2525). The task was repeated limiting the number of training examples (e.g. 100%, 25%, 6% dataset) imitating the scenario where the apparatus does not have access to a vast number of annotated examples.

In the application various tests were performed with the output of the CNN being conditioned on i) position of the input image within the heart volume (e.g. basal slice indicated by 1), and (ii) cardiac phase (e.g. end-systolic) during the input image was acquired.

| | | 100% dataset | | 25% dataset | | 6% dataset | |
| --- | --- | --- | --- | --- | --- | --- | --- |
| Method | Notes | Position (i) Dice | Phase (ii) Dice | Position (i) Dice | Phase (ii) Dice | Position (i) Dice | Phase (ii) Dice |
| Baseline | No conditioning | .870 (±.019) | | .782 (±.025) | | .536 (±.060) | |
| FiLM | — | .847 (±.045) | .854 (±.039) | .734 (±.163) | .760 (±.054) | .599 (±.054) | .557 (±.076) |
| Guide Me | — | .837 (±.04) | .762 (±0.214) | .778 (±.02) | .776 (±.024) | .537 (±.055) | .548 (±.05) |

|  |  | 100% dataset | | 25% dataset | | 6% dataset | |
| --- | --- | --- | --- | --- | --- | --- | --- |
|  |  | Position (i) Dice | Phase (ii) Dice | Position (i) Dice | Phase (ii) Dice | Position (i) Dice | Phase (ii) Dice |
| Method | Notes | | | | | | |
| Proposed | Exclusive Attention | 0.878** (0.015) | 0.877* (0.016) | 0.802** (0.014) | 0.789* (0.018) | 0.622* (0.052) | 0.614** (0.038) |

Figure 4:
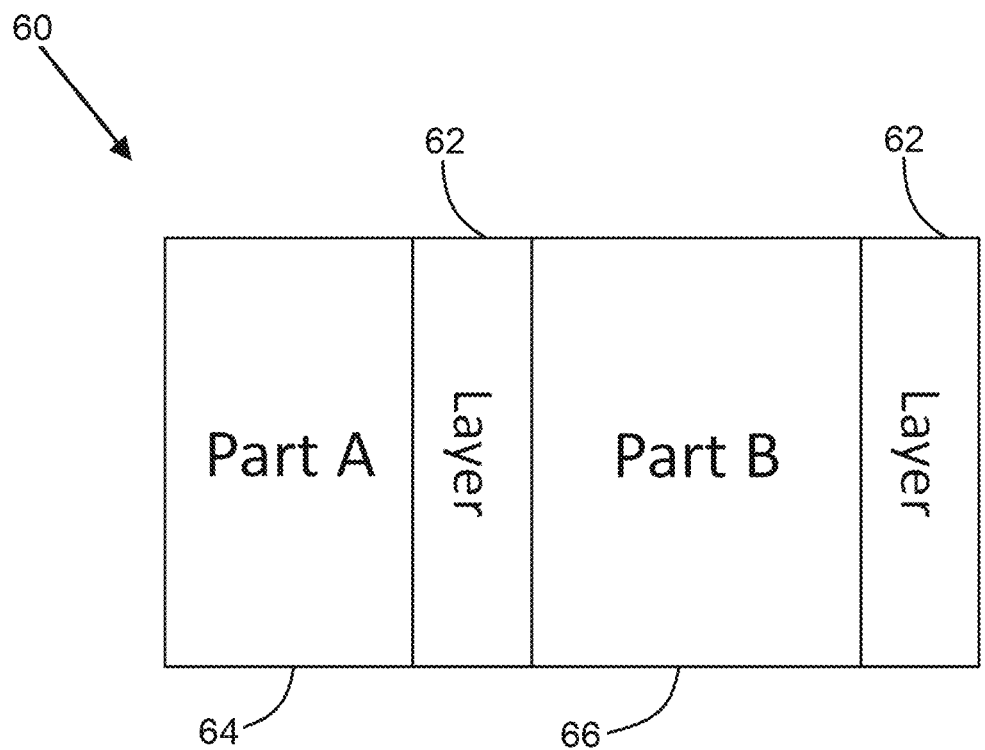
FIG. 4 is a schematic illustration of a network in accordance with an embodiment.

According to embodiments, the filter based on non-image data, and for example providing a position-dependent attention map, can be provided or implemented as a layer of the CNN or other model. The location of the filter, e.g. implemented as a layer, can vary between embodiments and may be included in various locations of the network as desired. The layer in question, comprising the filter based on non-image data, and for example providing a position-dependent attention map, may appear more than once in the network. FIG. 4 illustrates an embodiments where the filter layer 62 in question is provided twice in a CNN 60. The other layers or other components of the CNN 60 are indicated as block 64 (labelled part A) and block 66 (labelled part B).

Once trained the model, for example, the CNN can be applied to any suitable data set to perform the task for which it has been trained, for example to label an anatomical feature or pathology in an image data set.

Figure 5A:
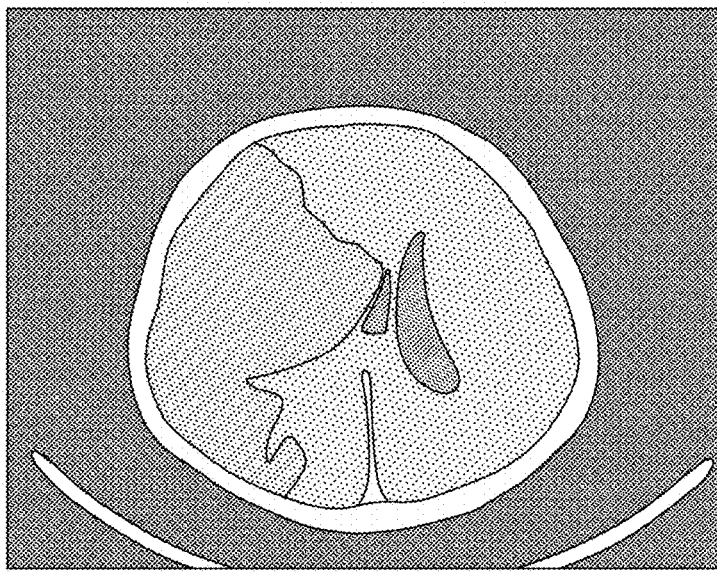
FIGS. 5a and 5b are images with and without an attention map overlay.
Figure 5B:
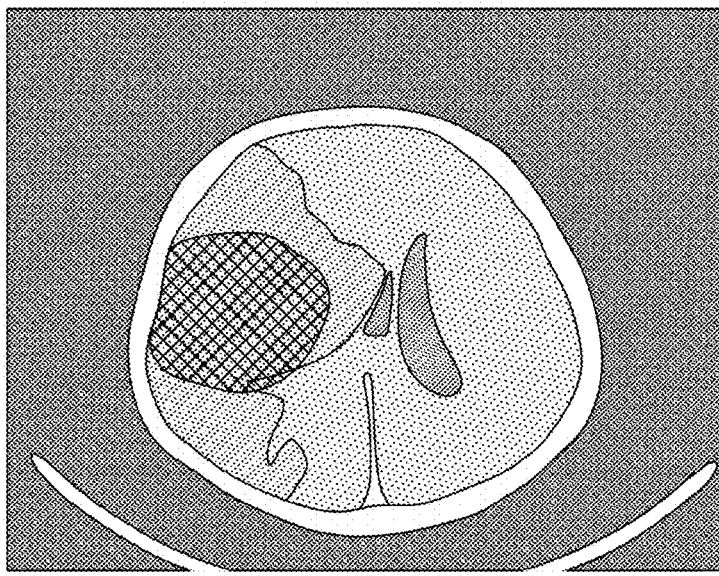

In some embodiments, a visual representation of the spatially varying function is displayed together with, for example overlaid on, an image obtained from an image data set. The image may comprise a representation of a segmentation or other labelling produced by the trained mode, e.g. the CNN. By displaying a representation of the filter for example the Gaussian, a user can see where, for example on which part of an image space, attention has been focused when training the model. This may be useful for example in assisting the user in understanding the training process or in gaining the trust of the user that a model training process was reliable. An overlay of a representation of a filter being used to provide position-dependent attention is illustrated in FIG. 5a, in which the image is shown without the filter representation overlaid, and FIG. 5b, in which the image is shown with the filter representation overlaid.

Figure 6:
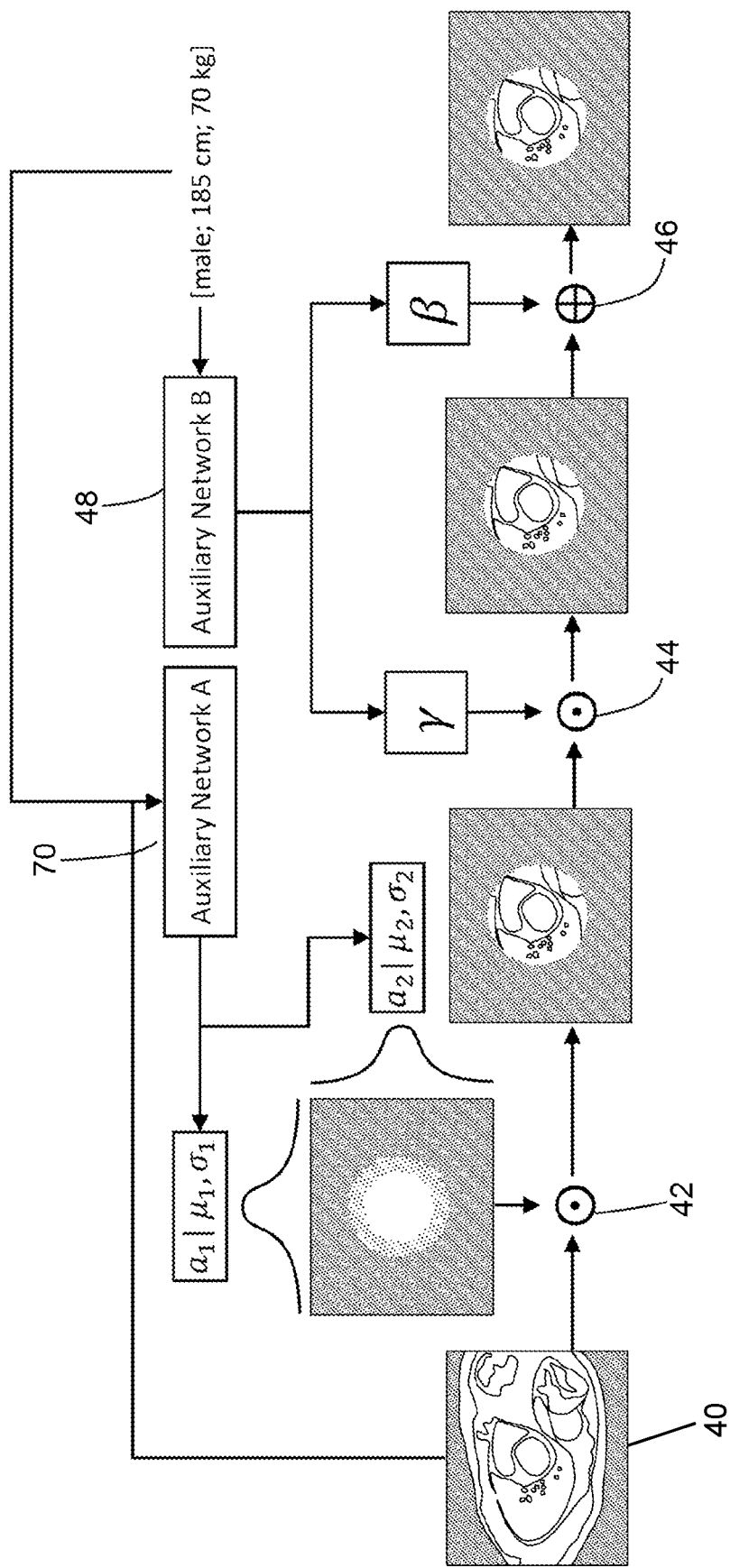
FIG. 6 is a schematic illustration of a process performed by the embodiment of FIG. 1.

In the embodiment of FIG. 2, the filter 42 is used to direct attention based on absolute position in an image space. In alternative embodiments the filter, for example the Gaussian(s), can be used to direct attention to a region of interests based on relative positions, for example relative positions between anatomical features and/or pathologies. Thus, positions of objects may be encoded or otherwise represented relatively to each other (e.g. "right ventricular cavity is next to myocardium" as well as or instead of "position (150, 75) in the pixel space"). One such alternative embodiment is illustrated schematically in FIG. 6, in which like reference numerals refer to like features. The embodiment of FIG. 6 is similar to that of FIG. 2, but includes an additional auxiliary network 70 that is used to generate the filter (for example, determine parameters of one or more Gaussians) that is used to encode, or direct attention based on, relative position.

Certain embodiments provide a method of processing data comprising:
  determining parameter values for a spatially varying function using additional conditioning data that is relevant to a spatial distribution of values of the data;
  applying the spatially varying function to the data, so that processing said data is dependent on said spatially varying function.

The parameter values for the spatially varying function may be determined using both the data and the additional conditioning data. The data may comprise a plurality of sets of data. Each of at least some, optionally all, of the sets of data may have associated conditioning data.

The spatially varying function may comprise a plurality of spatially varying functions.

The data may comprise sets of imaging data and the additional conditioning data may comprise non-imaging data.

The data may comprise medical imaging data, text data or any suitable type of data. The data may comprise ECG or other sensor data, acceleration data, wearable device data and/or any suitable sequential signal or suitable time-dependent signal.

The data may comprise at least one magnetic resonance (MR) data, computed tomography (CT) data, X-ray data, ultrasound data, positron emission tomography (PET) data, single photon emission computed tomography (SPECT) data, or patient record data.

The sets of data may comprise labelled sets of data with labels comprising or representing a classification and/or a segmentation and/or an identification of an anatomical feature or pathology.

The data may comprise imaging data representing images of patients, and the additional conditioning data may represent, for at least some of the patients, at least one characteristic of the patient or at least one property of an imaging procedure or imaging apparatus used to obtain the image(s).

The conditioning data may comprise or represents at least one of age, weight, sex, presence or absence of a particular medical condition.

The conditioning data may comprise or represent output(s) of another method that processes other data, electronic health records (EHR), or any data that is correlated to the visual properties found in the image (e.g. pathology, acquisition settings, etc.).

The spatially varying function may comprise an attention function. The applying of the spatially varying function may be such as to give greater or lesser significance to the data in the processing determined according to the spatially varying function The spatially varying function may comprise a filter.

The method comprises a method of training a model. The model may comprise a plurality of layers. The data may comprise sets of training data. The applying of the spatially varying function may comprise applying the spatially varying function with respect to outputs of a layer of the model as part of the training of the model.

The model may comprise a machine learning model.

The model may comprise a neural network. The determining of the parameter values for the spatially varying function may comprise training an auxiliary model to obtain the parameter values, and the auxiliary model may comprise an auxiliary neural network.

The determining of parameter values for the spatially varying function may comprise applying a process that encourages the spatially varying function to be non-spatially uniform.

The applying of a process that encourages the spatially varying function to be non-spatially uniform may comprise using a penalty in a loss function, for example to penalise larger values of standard deviation for the function in comparison to smaller values of standard deviation.

The applying of the spatially varying function to outputs of a layer of the model may comprise applying the spatially varying function as part of a further layer of the model, the outputs of said layer may be used as inputs to said further layer.

Said further layer may comprise a plurality of feature maps and/or channels, and the applying of the spatially varying function may comprise applying different function parameter values and/or different functions in respect of different ones of the feature maps and/or channels.

The method may comprise determining respective parameter values of the spatially varying function for each of a plurality of channels and/or feature maps.

The method may further comprise applying a process that encourages a variation in the position of the peak or other characteristic of the spatially varying function for different ones of the plurality of channels and/or feature maps.

The determining of respective parameter values of the spatially varying function may comprise learning the parameter values separately for each of a plurality of channels and/or feature maps using the auxiliary neural network.

Applying the spatially varying function to outputs of the layer of the model may comprise applying different spatially varying functions to different feature maps and/or channels.

The method may comprise determining parameter values for plurality of spatially varying functions, and applying the spatially varying functions in respect of outputs of a plurality of different layers of the model as part of the training of the model.

The applying of the spatially varying functions to outputs of a plurality of different layers of the model may comprise applying the plurality of spatially varying functions in a plurality of further layers of the model.

The method may comprise representing relative positions of two or more features of interest using the spatially varying function.

The determining of the parameter values for the spatially varying function may further comprise using the additional conditioning data together with said data and/or with at least one of volumetric data, image data, text data, metadata, audio data to determine the parameter values.

The method may further comprise displaying a visual representation of the spatially varying function.

The spatially varying function may comprise a differentiable function and/or a compact parameterized function. The spatially varying function may comprise a Gaussian function or a Student's T function or any smooth and efficiently parametrised function or mixture of functions. The spatially varying function may comprise a product of at least two vectors, optionally at least two Gaussian vectors, and/or a matrix. The spatially varying function may comprise a multivariate function, optionally a multivariate Gaussian. The additional conditioning data may comprise at least one of image data, text data, metadata, audio data and/or structured data.

The method may comprise applying the model to a data set to produce an output.

The data set may comprise an imaging data set, the output may comprise an image, and the method may further comprise including a visual representation of the spatially varying function.

The output may comprise at least one of a label and/or a classification and/or a segmentation and/or an identification of an anatomical feature or pathology. The output may be used to address, and/or may comprise an output representative of, disease classification, anatomy or pathology delineation, or anatomy or pathology detection.

Certain embodiments provide a data processing apparatus comprising processing circuitry configured to determine parameter values for a spatially varying function using a plurality of sets of input data and additional conditioning data that is relevant to a spatial distribution of values of the input data;

apply the spatially varying function to at least one of the sets of input data, optionally all of the sets of input data, so that processing said at least one of the sets of input data is dependent on said spatially varying function.

Certain embodiments provide a neural network model comprising a plurality of layers;

a spatially dependent conditioning layer between one of the layers and another of the layers the spatially dependent conditioning layer configured to apply a spatially varying function that is determined based on a combination of sets of imaging data and associated non-imaging data.

The spatially dependent conditioning layer may be configured using, or may comprise, an auxiliary network Certain embodiments provide a medical image processing apparatus comprising a processing circuitry configured to: receive medical image data of a subject and non-medical image data which is a parameter relating to the subject, generate a filter which is applied to the medical image data based on the non-medical image data, wherein the filter is a filter which limits a region of the medical image data.

The non-medical image data may comprise at least one of sex, height, weight, BMI, disease.

The filter may comprise a Gaussian filter.

The processing circuitry may be further configured to decide parameters of the Gaussian filter based on the non-medical image data.

The processing circuitry may be further configured to decide a peak position and variance of the Gaussian filter based on the non-medical image data.

The processing circuitry may be further configured to include a neural network that outputs parameters of the Gaussian filter based on the non-medical image data input.

Certain embodiments provide a method for integrating spatial information comprising
a) a neural network,
b) a set of training examples and additional conditioning data which is spatially related to the training points in which,
c) the additional information is integrated in the form of attention from a differentiable function (e.g. Gaussian, Student's T-distribution), and/or
d) the attention parameters are predicted using an auxiliary network, and/or
e) the attention mechanism may be learned separately for each channel, and/or
f) a penalty in a loss function may be used to encourage learning an informative (non-uniform) function e.g. in the case of Gaussian functions, penalise large standard deviation, encourage means of Gaussians in different channels to be dispersed,
g) the additional information may be one or more of image, text, meta-data, audio or other structured data.

The Gaussian parameters may be replaced by any suitable compact parametrized function.

The auxiliary network responsible for learning the parametrized attention function may also be fed the or a source volume, image, text, meta-data, audio in order to better localize the feature within the original data.

A user interface may be provided to allow a user to apply non imaging data to the network and see how the resulting final attention map may vary.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image data processing apparatus, comprising:
hardware processing circuitry configured to
receive medical image data in respect of at least one subject, wherein the medical image data comprise sets of training data;
receive non-image data;
generate a filter based on the non-image data; and
apply the filter to the medical image data, wherein the filter is configured to limit a region of the medical image data,
wherein the processing circuitry is further configured to train a model, the model comprising a plurality of layers, and apply the filter with respect to outputs of a layer of the model as part of the training of the model.

2. The apparatus according to claim 1, wherein:
the model comprises a neural network; and
the processing circuitry is further configured to generate the filter by training an auxiliary model to obtain at least one parameter value for the filter, and the auxiliary model comprises an auxiliary neural network.

3. The apparatus according to claim 2, wherein the obtaining of the at least one parameter value for the filter by the processing circuitry comprises learning the at least one parameter value separately for each of a plurality of channels and/or feature maps using the auxiliary neural network.

4. The apparatus according to claim 1, wherein the processing circuitry is further configured to apply the filter as part of a further layer of the model, the outputs of said layer being used as inputs to said further layer.

5. The apparatus according to claim 4, wherein said further layer comprises a plurality of feature maps and/or channels, and the processing circuitry is further configured to apply the filter by using different parameter values and/or different functions for different ones of the feature maps and/or channels.

6. The apparatus according to claim 1, wherein the processing circuitry is further configured to determine respective parameter values of the filter for each of a plurality of channels and/or feature maps.

7. The apparatus according to claim 1, wherein the processing circuitry is further configured to at least one of:
determine parameter values for a plurality of filters, and apply the filters in respect of outputs of a plurality of different layers of the model as part of the training of the model; or
apply a process that causes a variation in a position of a peak or other characteristic of the filter for different ones of a plurality of channels and/or feature maps.

8. The apparatus according to claim 1, wherein the received non-image data comprises or represents at least one of age, weight, sex, presence, or absence of a particular medical condition, at least one property of an imaging procedure or imaging apparatus, an output of another method, electronic health records (EHR), text data, structured data, metadata, DICOM data, or DICOM metadata.

9. The apparatus according to claim 1, wherein the filter is a Gaussian filter.

10. The apparatus according to claim 9, wherein the processing circuitry is further configured to determine parameters of the Gaussian filter based on the received non-image data.

11. The apparatus according to claim 10, wherein the processing circuitry is further configured to provide a neural network that outputs parameters of the Gaussian filter based on the received non-image data as input.

12. The apparatus according to claim 1, wherein
the filter represents a position of a feature of interest; or
the filter represents relative positions of two or more features of interest.

13. The apparatus according to claim 1, wherein the processing circuitry is further configured to cause a display to display a visual representation of the filter on an image obtained from an image data set.

14. The apparatus according to claim 1, wherein at least one of:
the filter comprises a differentiable function and/or a compact or efficiently parameterized smooth function;
the filter comprises a Gaussian function or a Student's T-distribution;
the filter comprises a product of at least two vectors, and/or a matrix; and
the non-image data comprises at least one of text data, metadata, audio data, and/or structured data.

15. The apparatus according to claim 1, wherein the processing circuitry is further configured to apply the trained model to a data set to produce an output.

16. A medical image data processing apparatus, comprising:
hardware processing circuitry configured to
receive medical image data in respect of at least one subject;
receive non-image data;
generate a filter based on the non-image data; and
apply the filter to the medical image data, wherein the filter is configured to limit a region of the medical image data,
wherein the filter is a Gaussian filter; and
wherein the processing circuitry is further configured to determine a peak position and a variance of the Gaussian filter based on the received non-image data.

17. A medical image data processing apparatus, comprising:
hardware processing circuitry configured to
receive medical image data in respect of at least one subject;
receive non-image data;
generate a filter based on the non-image data; and
apply the filter to the medical image data, wherein the filter is configured to limit a region of the medical image data,
wherein the processing circuitry is further configured to generate the filter by using a penalty in a loss function to penalize spatial uniformity.

18. A method of processing medical image data, comprising:
receiving medical image data in respect of at least one subject, wherein the medical image data comprise sets of training data;
receiving non-image data;
generating a filter based on the non-image data; and
applying the filter to the medical image data, wherein the filter is configured to limit a region of the medical image data,
wherein the method further comprises
training a model, the model comprising a plurality of layers; and
applying the filter with respect to outputs of a layer of the model as part of the training of the model.

* * * * *